3,645,997
CHELATING COMPOSITIONS
Gaetano F. D'Alelio, 2011 E. Cedar St.,
South Bend, Ind. 46617
No Drawing. Continuation-in-part of application Ser. No.
638,615, May 15, 1967. This application Sept. 4, 1969,
Ser. No. 855,366
Int. Cl. C08f 7/12, 19/20
U.S. Cl. 260—88.1                    19 Claims

ABSTRACT OF THE DISCLOSURE

New triazine compounds are disclosed having attached to the three valencies of the symmetrical triazine nucleus at least one A′ group containing a terminal polymerizable $CH_2{=}C{<}$ group and at least one chelating T group of the class:

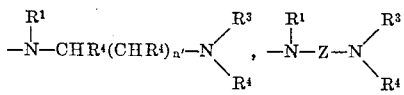

and

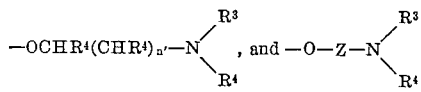

wherein each of the symbols, $R^1$, $R^2$ and $R^3$ individually represents a radical selected from the class of —H, —$CHR^4COOM$ and a hydrocarbon radical containing 1–6 carbon atoms and wherein at least one of the radicals represented by $R^1$, $R^2$ and $R^3$ contains a carboxyl group, M is a member consisting of hydrogen, ammonium bases and metals, and $R^4$ represents a radical selected from the class consisting of hydrogen and a hydrocarbon radical containing 1–6 carbon atoms, $n'$ represents an integer of 1–6 and —Z— is a divalent hydrocarbon radical containing 6–12 carbon atoms. These compounds are useful as chelating compositions particularly for the removal of metal from solutions of metal compounds.

---

This application is a continuation-in-part of copending application Ser. No. 638,615, filed May 15, 1967, and now abandoned.

This invention relates to new chemical compounds and more particularly to triazine derivatives. The invention is concerned especially with the production and use of new and useful triazines having the property of coordinating metal ions.

The chemical compounds of this invention may be represented by the general formula

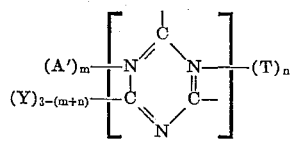

wherein $n$ and $m$ are integers of at least one and no more than two and the sum of $m$ and $n$ does not exceed three; Y is any monovalent radical; A′ is a group containing a terminal polymerizable $CH_2{=}C{<}$ group; and T is selected from the class of

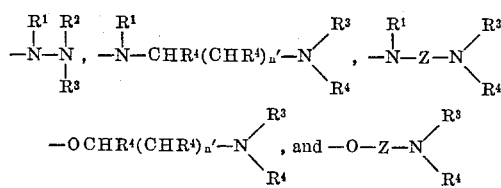

wherein each of the symbols, $R^1$, $R^2$ and $R^3$ individually represents a radical selected from the class of —H, —$CHR^4COOM$ and a hydrocarbon radical containing on to six carbon atoms and wherein at least one of the radicals represented by $R^1$, $R^2$ and $R^3$ contain a carboxyl group, M is a member consisting of hydrogen, ammonium bases and metals, and $R^4$ represents a radical selected from the class consisting of hydrogen and a hydrocarbon radical containing one to six carbon atoms, $n'$ represents an integer of one to six, and —Z— is a divalent hydrocarbon radical containing six to twelve carbon atoms.

In the above triazine formula, Y can be R which represents hydrogen or any monovalent hydrocarbon radical, whether saturated or unsaturated, substituted or unsubstituted, aliphatic, carbocyclic, aryl or heterocyclic mono- or polynuclear, etc. Examples of suitable hydrocarbon groups represented by R are aliphatic, aromatic e.g., methyl, ethyl, propyl, isopropyl, butyl, secondary butyl, butenyl, amyl, hexyl, allyl, methallyl, cyclopentenyl, cyclohexyl, cyclohexenyl, phenyl, diphenyl naphthyl, tolyl, xylyl, ethylphenyl, propylphenyl, isopropyl phenyl, allylphenyl, benzyl, phenylallyl, phenylpropyl, etc. and their homologues, as well as those groups with on or more of their hydrogen atoms substituted by halogens as, for example, fluorine, chlorine, nitro groups, nitroso groups, amino groups, carboxy groups, etc., Y can also be hydroxyl and the alkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, th o-, m-, and p-cresols, the xylenols, the naphthols, ethyl ene glycol, methyl glycol ether, butyl glycol ether, glycerine, pentaerythritol, naphthol, hydroxy pyridine, in cluding the alkoxy and aryloxy radicals of hydroxy acid and esters, such as lactic acid, ethyl lactate, allyl lactate methyl salicylate, and the chloro derivatives such as chloo rophenol, chloronaphthol, ethylene chlorohydrin, and th acetoxy derivatives such as acetoxyethyl alcohol, etc., and these radicals are represented by RO—; Y can also b R—S— groups which are the mercapto equivalents t RO—; Y can also be —$NR_2$, that is, an amino group a monosubstituted amino group or a disubstituted amino group, as for example, the radicals of methyl amine, ethy amine, butyl amine, nonyl amine, benzyl amine, dimethyl amine, aniline, naphthylamine, ethanolamine, diethanol amine, diisopropylamine, methylaniilne, piperidine, amine pyridine, and the hydrazine radicals, namely $R_2NNR$— from hydrazine, unsymmetrical dimethyl-hydrazine, sym metrical dimethyl-hydrazine, trimethylhydrazine, phenyl hydrazine; Y can also be the N-radicals of the amino acids, the aminoesters, the aminoamides, and the amine nitriles, some specific examples of which are

—$NHCH_2COOH$

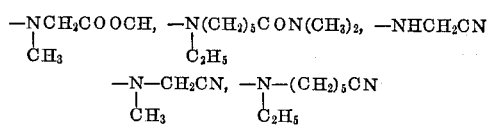

—$NHC_2H_4CN$, —$NHC_6H_4NHOCCH_3$; Y can also b radicals of alkylene imines, such as, for example,

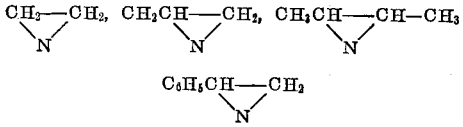

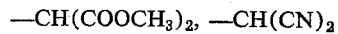

and the radicals of malonic esters and substituted malonic esters, nitriles, and amides, such as, for example,

—$CH(COOCH_3)_2$, —$CH(CN)_2$ $-CH(COOCH_2CH=CH_2)_2$, $-CH[CON(CH_2)_2]_2$

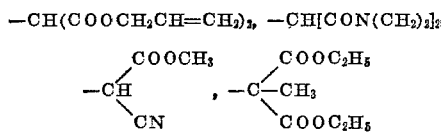

tc.; or Y can be the radical of another triazinyl ring, .g., $(CN_3NH)_2(C_3N_3)-$, $(HO)_2(C_3N_3)-$, or the triaine ring can be attached through a bridge, such as $[(CH_3)_2N]_2(C_3N_3)-NHCH_2CH_2NH-$ $(C_2H_5NH)_2(C_3N_3)-OCH_2CH_2O-$ $(H_2N)_2(C_3N_3)-NHCH_2CH_2O-$ tc.; Y can also be chlorine, bromine, $-CN$, COOR, etc.; s well as T.

The Y group can also be a solubilizing group, or a ;roup modified to impart solubility of the triazine com->ound in water or in organic solvent. A few illustrative xamples of water solubilizing groups are $H(OCH_2CH_2)_{n'}O-$

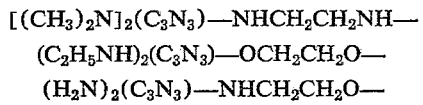

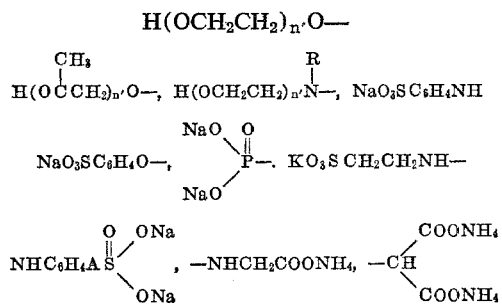

$-NH(CH_2)_{n'}N(CH_3)_2 \cdot HCl$, etc., wherein $n'$ has a numerical value of at least 1 and can be as high as 15 to 20.

When the new compounds of this invention contain Y ;roups of the type illustrated above, the compounds are ion-resinous and non-polymeric and function as ligands n the formation of coordination compounds useful in the >reparation of pigments and for removing metal ions from olutions. Because of the trivalent nature of the symmetrial triazine ring, a large number of permissible Y groups an be attached to the ring, including chemically active ;roups. When the Y groups are such that they can under-;o addition or condensation polymerizations, then resins nd polymers are readily prepared which are characterzed by having within their repeating units a triazine ring o which at least one T group is attached. Furthermore, t is not necessary to prepare polymers of this type by >olymerization reactions involving one or two Y groups, ince it is possible, as shown hereinafter, to react many >f the non-polymeric compounds of this invention with >reformed polymers thereby attaching the triazinyl co->rdination moiety to the preformed polymer.

Thus, the Y group can also be a postreactive group, uch as an aldehyde reactive group, which may be desig-1ated as an A group, by which the new compounds of this nvention can be converted to condensation products by eaction with the aldehydes, polymeric aldehydes, alde-1yde-addition products, etc., such as formaldehyde, para-ormaldehyde, acetaldehyde, propionaldehyde, acrolein, ildol, glycose, dimethylol urea, trimethylol melamine, 1examethylol melamine, etc.

T represents a grouping of atoms having a chelating or :oordination function with metal ions, that is, T contains unctional groups capable of forming complexes with netal salts through covalent linkages rather than through ɛlectrovalent linkages.

The essential difference between the ordinary electro-valent bond and the covalent bonds in the coordination :ompounds may be demonstrated by comparing non-poly-neric molecules containing such bonds. The bond in the former is ionic and similar to those that exist in such :ompounds as sodium phosphate, copper acetate, nickel sulfate, aluminum nitrate and many other salts. The bonds in the latter are in compounds of metals such as chromium, iron, cobalt, molybdenum, uranium, nickel, copper, zinc, platinum, mercury, gold, silver, titanium, zirconium, vanadium, etc. A typical example of such a coordination compound is hexamine-cobalt(III) chloride, whose formula is $Co(NH_3)_6Cl_3$; this compound is prepared by reacting cobaltic chloride, $CoCl_3$, which has its ionic valencies satisfied, with six moles of ammonia whereby the ammonia molecules are coordinated to the cobalt atom through non-ionic covalent linkages. Ethylenediamine will also complex with the cobaltic chloride to give trisethylenediamine-cobalt(III) chloride,

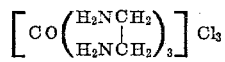

When the complexing compound, such as ethylenediamine, can occupy simultaneously more than a single coordinating position, ring formation can occur and ring structures may be found in the complex. Such ring compounds are known as chelate compounds. The ring-forming groups are known as polydentate groups or as chelating groups, in contrast to the monodentate groups which may coordinate without forming ring or chelate compounds.

A large number of organic compounds containing suitable substituent groups function as chelating compounds of which ethylenediamine, diethylenetriamine, etc., are typical examples. Another example is 2,2'-dipyridyl which complexes with ferrous chloride to give

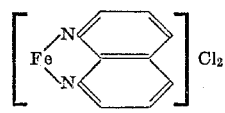

Other organic compounds which contain in their structures both salt forming groups and neutral donor groups can, through coordination or chelation, satisfy both the oxidation number of, and the coordination number of many metal ions, a typical example of which is the copper-(III) chelate of 8-hydroxy-quinoline

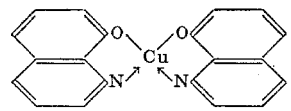

Glycine and substituted glycines behave similarly as shown in copper(II) glycinate,

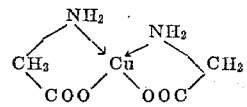

Accordingly, it is a proposal of this invention to attach T groups which act as coordination groups to the triazine rings, in which the T groups are selected from the class consisting of

wherein each of the symbols, $R^1$, $R^2$ and $R^3$ individually represent a radical selected from the class consisting of H, $-CHR^4COOM$, and a hydrocarbon radical containing 1–6 carbon atoms and wherein at least one of the radicals represented by $R^1$, $R^2$ and $R^3$ contain a carboxyl group; M is a member consisting o fhydrogen, ammonium bases and metals and $R^4$ represents a radical selected from the class of H and a hydrocarbon radical containing 1–6 carbon atoms. A few illustrative examples of the

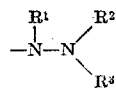

group are: $-NH-NHCH_2COOM$;

$-NHN(CH_2COOM)_2$ $$-NH\overset{C_2H_5}{\underset{|}{N}}CH_2COOM; -NH\overset{CH_3}{\underset{|}{N}}CH_2COOM; -NHN-\overset{CH_3}{\underset{|}{C}}H\overset{CH_3}{\underset{|}{C}}OOM$$

$$-N-\overset{CH_3}{\underset{|}{C}}-\overset{CH_3}{\underset{|}{C}}H_2COOM; -N-NHCH_2COOM; -N-N(C_2H_5)_2$$
$$\phantom{-N-}\overset{|}{CH_2COOM}$$

$$-\overset{CH_2COOM}{\underset{|}{N}}-N(CH_3)_2; -\overset{CH_2COOM}{\underset{|}{N}}-N(CH_2COOM)_2; -\overset{H}{\underset{|}{N}}-\overset{H}{\underset{|}{N}}-\overset{C_6H_5}{\underset{|}{C}}HCOOH; \text{etc.}$$

(2)
$$-NCHR^4(CHR^4)_{n'}-N\overset{R^2}{\underset{R^3}{\diagdown}}$$
$$\phantom{-NCHR^4}{\underset{|}{R^1}}$$

wherein $R^1$, $R^2$, $R^3$ and $R^4$ have the same meaning as previously described hereinabove, and $n'$ represents an integer of one to six. A few typical examples of these groups are: $-NHCH_2CH_2NHCH_2COOM$;

$-NHCH\ CH\ N(CH\ COOM)$ $$-\overset{CH_3}{\underset{|}{N}}CH_2CH_2\overset{CH_3}{\underset{|}{N}}CH_2COOM; -NHCH_2CH_2NH\overset{CH_3}{\underset{|}{C}}H-COOM$$

$$-NHCH_2CH_2NH\overset{C_6H_5}{\underset{|}{C}}HCOOM; -\overset{C_6H_5}{\underset{|}{N}}-CH_2CH_2N(CH_2COOM)_2$$

$-NHCH_2CH_2CH_2CH_2N(CH_2COOM)_2$ $-NH(CH_2)_6N(CH_2COOM)_2$; etc.

(3)
$$-N-Z-N\overset{R^2}{\underset{R^3}{\diagdown}}$$
$$\phantom{-N}{\underset{|}{R^1}}$$

wherein $R^1$, $R^2$ and $R^3$ have the same meaning as described hereinabove, and $-Z-$ is a divalent aromatic hydrocarbon radical containing 6–12 carbon atoms. A few illustrative examples of these groups are:

$-NHC_6H_4NHCH_2COOM$ $-NHC_6H_4N(CH_2COOM)_2$;

$-\overset{CH_3}{\underset{|}{N}}HC_6H_4N(CH_2COOM)_2$ $-NC_6H_3(CH_2)N(CH_2COOM)_2$;

$-NHC_6H_2(CH_3)_2NHCH_2COOM$ $-NHC_{10}H_5NHCH_2COOM$; etc.

(4)
$$-OCHR^4(CHR^4)_{n'}-N\overset{R^2}{\underset{R^3}{\diagdown}}$$

wherein $R^2$, $R^3$, $R^4$ and $n'$ have the same meaning as defined hereinabove, and a few illustrative examples are:
$-OCH_2CH_2N(CH_2COOM)_2$;

$$-OCH_2CH_2\overset{H}{\underset{|}{N}}CH_2COOM; O\overset{CH_3}{\underset{|}{C}}CH_2N(CH_2COOM)_2$$

$$-OCH_2CH_2CH_2\overset{CH_3}{\underset{|}{N}}CH_2COOM; OCH_2CH_2NH\overset{CH_3}{\underset{|}{C}}OOM; \text{etc.}$$

(5)
$$-O-Z-N\overset{R^2}{\underset{R^3}{\diagdown}}$$

wherein Z, $R^2$ and $R^3$ have the same meaning as defined hereinabove, a few illustrative examples of which are:

$$OC_6H_4\overset{H}{\underset{|}{N}}CH_2COOM; -O-C_6H_4N(CH_2COOM)_2$$

$$-O-C_6H_5\overset{CH_3}{\underset{|}{N}}-\overset{CH_3}{\underset{|}{C}}-COOM; -O-C_6H_3(CH_3)N(CH_2COOM)_2; \text{etc.}$$

In general, the triazine compounds used in the practice of this invention can be prepared conveniently by reacting in the presence of a hydrohalide acceptor, HAC, the corresponding halotriazines, for example, the bromo- or chloro-triazines with TH compounds wherein T is as previously defined, and H is an active hydrogen attached to the T group, e.g., $(C_3N_3))Cl_3 + 3TH \xrightarrow{HAC} (C_3N_3)(T)_3; Y(C_3N_3)Cl_2 + 2TH \xrightarrow{HAC}$ $Y(C_3N_3)(T)_2; Y_2(C_3N_3)Cl + TH \xrightarrow{HAC} (Y)_2(C_3N_3)T$ and some specific examples of the above reactions are $(NH_2)_2(C_3N_3)Cl + NH_2N(CH_2COONa)_2 \xrightarrow{NaOH}$
$(NH_2)_3(C_3N_3)[NHN(CH_2COONa)_2]$ $NH_2(C_3N_3)(Cl)_2 + 2NH_2N(CH_2COONa)_2 \xrightarrow{2NaOH}$
$NH_2(C_3N_3)[NHN(CH_2COONa)_2]_2$ $(C_3N_3)(Cl)_3 + 3NH_2NHCH_2COONa \xrightarrow{3NaOH}$
$(C_3N_3)(NHNHCH_2COONa)$ Alternately, these compounds can be prepared by using a halotriazine containing a T group as a substituent and reacting it with a compound containing a reactive hydrogen represented by YH, as for example:

$T(C_3N_3)Cl_2 + YH \xrightarrow{HAC} T(C_3N_3)(YH)_2$ and $T_2(C_3N_3)Cl + YH \xrightarrow{HAC} (T)_2(C_3N_3)YH$ and typical specific examples of the above reactions are $Cl_2(C_3N_3)NHN(CH_2COOM) + 2C_6H_5NH_2 \xrightarrow{Na_2CO_3}$
$(C_6H_5NH)_2(C_3N_3)NHN(CH_2CH_2COOM)$ $Br(C_3N_3)(NHNHCH_2COOM)_2 + (CH_3)_2NH \xrightarrow{Na_2CO_3}$
$(CH_3)_2N(C_3N_3)_2(NHNHCH_2COOM)$ The present invention is based on the discovery that new and valuable materials are obtained by having at least one T group of the type described above attached to the triazine ring. They can be used in the treatment of water to coordinate metallic ions and to maintain the ions in solutions when water-solubilizing groups are attached to the triazine ring, for example, $H(OCH_2CH_2)_2NH_2C_3N_3NHN(CH_2COOM)_2$ As such they are useful in laundering, chemical processing, etc. They can also be used in the preparation of stable pigments as for example the copper coordinate of $(C_3N_3)(NHNCH_2COOH)_2$ is a stable blue, and the cobalt coordinate is a stable red. These coordinate-pigments are water insoluble, especially if to the triazine there is attached one or two Y groups contributing to water insolubility, for example, $(C_4H_9)_2N(C_3N_3)NHN(CH_2COOM)_2$ and $[(C_4H_9)_2N]_2C_3N_3NHN(CH_2COOM)_2$; and they become organophilic when Y contains hydrocarbon groups such as $(C_{12}H_{25}NH)_2C_3N_3(NHCH_2CH_2NCH_2COOM)$ and $C_{12}H_{25}NHC_3N_3[OCH_2CH_2N(CH_2COOM)_2]$.

The compounds of this invention having suitable Y groups can be used also to prepare addition polymers which coordinate with metal ions.

By an addition polymerization is meant an intermolecular reaction involving at least a triazine of this invention which occurs without the formation of by-product molecules. The preparation of addition polymers from the new triazine compounds of this invention is readily demonstrated by the polymerization of the new triazine derivatives which have at least one polymerization ethylenic group attached to the triazine ring, such as illustrated by $CH_2=CH_6H_4NH(C_3N_3)T_2$, $CH_2=CHC_6H_4NH)_2C_3N_3(T)$, $CH_2=CHCOOCH_2CH_2NH(C_3N_3)T_2$, $(CH_2=CHCOOCH_2CH_2NH)_2C_3N_3(T)$, etc. These compounds are vinyl type monomers from which polymers may be prepared by methods well known n the polymer art. They may be polymerized alone or with each other or with other monomers to produce fusible or crosslinked polymers and copolymers suitable for chelating resin use as well as for pigment production. When the triazine monomers possess only one $CH_2=CH<$ group such as in $CH_2=CHC_6H_4NH(C_3N_3)T_2$ and $CH_2=CHCOOCH_2CH_2NH(C_3N_3)T_2$ then thermoplastic polymers are obtained, whereas when the triazine monomer contains at least two $CH_2=CH<$ groups, then crosslinked polymers are obtained.

By copolymerizing a monovinyl triazine compound of this invention with a divinyl trazine compound, crosslinked copolymers are obtained. Such crosslinking can also be obtained by using a monovinyl triazine compound with another crosslinking agent which is not a triazine. Such crosslinking compounds can possess a multiplicity of vinyl, vinylene or vinylidene groups.

A few illustrative examples of crosslinking monomers, that is monomers having a multiplicity of vinyl, vinylene or vinylidene groups, are divinylbenzene, divinylnaphthalene, vinyl isopropenyl benzene, vinyl allyl benzene, diisopropenyl benzene, diallyl benzene, the polyunsaturated esters such as ethylene glycol diacrylate, ethylene glycol dimethacrylate, trimethylene glycol dimethacrylate, diallyl aconate, glycol maleate, diallyl succinate, divinyl phthalate, diallyl maleate; the polyunsaturated ethers such as divinyl ether, trimethylene glycol dinvinyl ether, hydroquinone divinyl ether, catechol divinyl ether, resorcinol divinyl ether, hydroquinone diallyl ether, catechol diallyl ether, resorcinol diallyl ether, vinyl allylphenyl ether, vinyl vinylphenyl ether, allyl vinylphenyl ether, vinyloxy-vinyl benzoate, vinyloxy-allyl benzoate, allyloxy allylbenzoate; the polyunsaturated amides such as ethylene diacrylamide, ethylene dimethacrylamide, N-vinylcrylamide, N,N'-divinylphthalic diamide, N,N'-diallyl phthalamide, etc., and other polyunsaturated modifiers such as vinyl phenylacrylate, 2-isopropenyl-5-acryloxy-naphthalene, vinyl-3,5-diallyloxypalmitate, etc. The crosslinking monomers may be used alone or in conjunction with each other or with other monomers having one vinyl, vinylene or vinylidene groups such as vinyl chloride, vinylacetate, vinylpropionate, vinylbutyrate, vinylstearate, acrylonitrile, methacrylonitrile, vinylidene chloride, vinylene cyanide, alpha-chloroacrylonitrile, acrylic acid, the acrylic esters such as the methyl, ethyl, propyl, butyl, etc. acrylates; methacrylic acid and its esters such as the methyl, ethyl, propyl, butyl, hexyl, phenyl, etc. methacrylates; itaconic anhydride, itaconic acid and their mono- and diesters, such as the methyl, ethyl, propyl, etc. esters; the acrylic, methacrylic, chloroacrylic and the cyanoacrylic amides, N-alkyl amides, N,N-dialkyl amides; the alkenylaryl compounds such as styrene, the mono-methyl styrenes, the dimethyl styrenes, alpha-methyl styrenes, the mono-, di- and trichlorostyrenes, the o-, m-, and p-acetamido styrenes; vinyl naphthalene, vinyl carbazole, etc.; the alkenylaryl heterocyclic compounds such as vinyl pyridine, vinyl methyl pyridine, vinyl quinoline; the diene-1,3 compounds such as butadiene-1,3, isoprene, 2,3-dimethyl butadiene-1,3 chloroprene, 2-phenylbutadiene-1,3, methyl vinyl ketone, ethyl vinyl ketone, methyl isopropenyl ketone, N-vinyl imidazole, the vinyl azalactones, the N-vinyl-2-oxazolidinones, maleic anhydride, dimethyl maleate, etc.

These polymers and copolymers may be prepared in mass, in solution, in suspension and emulsion systems, using the accepted initiating systems, such as the per compound which generate radicals, or thermally, or with ultraviolet light or with ionizing radiation, and in some cases with ionic catalysts, both anionic and cationic, e.g., $BF_3$, $NaNH$, BuLi, HF, etc.

The formation of other types of addition polymers from the triazines of this invention is illustrated further by the reaction through ring opening of triazine compounds containing at least one T group and other group containing the structure

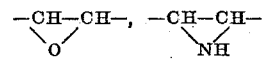

etc., or by the addition reaction of a triazine containing at least one T group and two —NCO groups with another compound, including triazines which contain at least two active hydrogens such as diols, diamines, amino alcohols, etc., or by the reaction of a triazine having at least one T group and two other groups containing active hydrogens with a diisocyanate, etc.

As chelating resins they are particularly useful in recovering the metals of the common chelating-forming metals, such as Al, Ti, V, Si, Cr, Mn, Fe, Co, Ni, Cu, Zn, Ga, Ge, As, Y, Zr, Cb, Mo, Tc, Rn, Pl, Pd, Ag, Cd, In, Sn, Sb, Hf, Ta, W, Rh, Os, Ir, Pt, Au, Hg, Tl, Pb, Bi, the lanthanides, the actinides, Sc, Ca and Mg, and for separating the metals from each other.

Dyes, pigments, plasticizers, mold lubricants, opacifiers, and various reinforcing fillers (e.g., wood flour, glass fibers, including difibrated asbestos, mineral wool, mica, clothing cuttings, glass cloth, glass mat, etc.) can be compounded with the resin in accordance with conventional practice to provide various thermoplastic and thermosetting molding compositions.

The modified and unmodified resinous compositions of this invention have a wide variety of uses. For example, in addition to their use in the production of molding compositions, they can be used as modifiers of other natural and synthetic polymers, as laminating varnishes in the production of laminated articles wherein sheet materials, e.g., paper, cloth, sheet asbestos, glass mats and glass fibers, etc., are coated and impregnated with the resin, superimposed and thereafter united under heat or heat and pressure. They can be used in the production of wire coatings or backing enamels from which insulated wires and other coated products are made; for bonding or cementing together mica flakes to form a laminated mica article, for bonding together abrasive grains in the production of resin-bonded abrasive articles such as, for instance, grindstones, sandpapers, emery cloths, etc.; in the manufacture of electrical resistors, etc. They can also be employed for treating cotton, linen, and other cellulosic materials in sheet or other form. They can also be used as impregnants for electrical coils and for other electrically insulating applications.

One aspect of the present invention is based on the discovery that new and valuable materials having particular utility in the polymer, plastics, impregnating and coating arts can be produced. The modified and unmodified polymer products have a wide variety of uses. Those products having the T grouping can be used as molding compounds, laminating varnishes, impregnants alone or with other polymers and fillers, in the conventional manner; they act as preservatives for cellulosic substances, such as paper, wood, cotton, wool, leather, silk, proteins and the like; and they can also be used as resins to increase the wet-strength of paper and wood pulps. Those products containing an —$SO_3H$ or

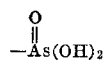

grouping can be used as ion exchange resins, as preservatives, as their copper or 8-hydroxy quinoline salt, as additive binders to insecticidal formulations, and as additives to increase the wet strength of paper while preserving it. The calcium, zinc, and magnesium salts of these products can be used as molding compounds and as modifiers for other natural and synthetic polymers, for example, in laminating varnishes and in the production of laminated products wherein sheet materials, e.g., paper, cloth sheet asbestos, glass mats, glass fibers, etc., are coated and impregnated with resin, superimposed and thereafter united under heat and pressure.

The products of this invention containing chromium are particularly useful in the treating and tanning of leathers. As is well known, resin tannage should be water-soluble or water-dispersible and their solutions should tolerate fair concentration of salt. They should be capable of penetrating into the skin before and during early stages of tanning and before and during the early stages of polymerization. Preferably the tannage should be very pale or water-white in color. These objectives are achieved by using products made according to the practice of this invention; for example, the tolerance to the salt solution, that is, the salting-out value of the water-solubility can be changed by varying the number of T acids attached to the triazine ring, e.g., $(NH_2)(C_3N_3)T_2$ or $(NH_2)_2(C_3N_3)$—T or by using a sulfonic acid substituent along with the T, e.g., $(NH_2)(C_3N_3)(-NHC_6H_4SO_3Na)(T)$ or $(NH_2CONHNH)(-NHC_6H_4SO_3Na(T)$ or by condensing with urea, melamine, dimethylol urea, dimethylol melamine, trimethylol melamine, phenol alccohols, etc., and by varying the ratio of such modifying condensing substances. Also by using the products made according to the practice of this invention, the fat-liquoring characteristics of the tannage can be readily changed by selecting appropriate R groups in the triazine derivative, for example, by using $(C_{10}H_{21}NH)_2(C_3N_3)$—T and $(C_{10}H_{21}NH)(C_3N_3)(T)_2$ instead of the corresponding —$NH_2$ substituted triazines. Furthermore, the solubility of dispersibility of the condensation product can be increased by using as Y groups those groups that increase solubility, such as $H(OCH_2CH_2)_n$—O— and $H(OCH_2CH_2)_{n''}$—O— where $n''$ has a numerical value of one to fifty or more. Also, these products can be modified so that they act as flame-retardants as well as preservatives not only for leather but for such substances as wool, cotton, wood, paper, etc., by using compounds in the practice of this invention in which Y represents groups such as;

$$-\overset{O}{\overset{\|}{P}}(OR)_2, \quad -\overset{O}{\overset{\|}{\underset{NR_2}{P}}}-OR$$

—$C_6Cl_5$, etc.

The triazine derivatives embraced by the formulas of the various classes of compounds used in producing the new products of this invention are the triazine derivatives having substituents indicated by the groups attached to the structure $$(A')_m \left[ \begin{array}{c} \text{triazine ring} \end{array} \right] (T)_n$$
$$(Y)_{3-(m+n)}$$

wherein $n$ and $m$ are integers of at least one and no more than two and the sum or $n$ and $m$ does not exceed three, and A', Y and T are as hereinabove defined.

The monomeric triazine compounds of this invention are converted to addition polymers by the use of free-radical-generating initiators such as peroxy compounds, persulfates, azo compounds, etc. Particularly preferred are peroxides and hydroperoxides such as benzoyl peroxide, acetyl peroxide, lauroyl peroxide, ditertiarybutyl diperphthalate, t-butyl perbenzoate, t-butyl hydroperoxide, di-t-butyl peroxide, dicumyl peroxide, cumylhydroperoxide, etc.

The polymerization conditions are those normally used for addition polymerizations with conditions modified according to the particular molecular weight desired, the particular catalyst used, etc. These polymerizations may be conducted in an emulsion, suspension, mass or solution polymerization system. For most purposes the polymer products have molecular weights of 500 up to 1,000,000 or even higher where desired. In some cases where liquid polymers are desired, the molecular weights can be even lower, for example, about 200.

One class of addition polymers is the linear polymer derived from a triazine derivative containing at least one T group, and one Y or A' group containing a polymerizable terminal $CH_2=C<$ group as in the monomers:

$CH_2=CHCOOCH_2CH_2NH(C_3N_3)$
$\quad\quad\quad\quad\quad\quad [N(CH_3)_2][NHN(CH_2COOM)_2]$ $CH_2=CHC_6H_4NH(C_3N_3)[N(CH_3)_2]$
$\quad\quad\quad\quad\quad\quad [NHN(CH_2COOM)_2]$ $\underset{\underset{CH_3}{|}}{CH_2=C}COOCH_2CH_2NH(C_3N_3)[N(CH_3)_2][NHN(CH_2COOM)_2]$ $CH_2=CHC_6H_4O(C_3N_3)[N(CH_3)_2]$
$\quad\quad\quad\quad\quad\quad [NHN(CH_2COOM)_2]$ wherein polymerization of the $CH_2=C<$ group in the monomer results in the polymer.

Another class of addition polymers is the crosslinked polymers derived from a triazine derivative containing one T group and two groups containing a $CH_2=C<$ group as in the monomers:

$(CH_2=CHCOOCH_2CH_2NH)_2(C_3N_3)$
$\quad\quad\quad\quad\quad\quad NHN(CH_2COOM)_2$ $(CH_2=CHC_6H_4NH)_2(C_3N_3)NHN(CH_2COOM)_2$ $(CH_2=CHC_6H_4)_2(C_3N_3)NHN(CH_2COOM)_2$ $(CH_2=CHCH_2O)_2(C_3N_3)NHCH_2CH_2N(CH_2COOM)_2$ etc.

A further class of addition polymers of this invention is the addition polymerization products of a triazine derivative containing at least one T group and at least one other group containing an oxirane structure, as in the monomers:

$\left(\underset{O}{CH_2\text{—}CHCH_2O}\right)(C_3N_3)_2N(CH_3)_2NHN(CH_2COOM)_2$ $\left(\underset{O}{CH_2\text{—}CHCH_2O}\right)_2(C_3N_3)NHCH_2CH_2N(CH_2COOM)_2$ $\left(\underset{O}{CH_2\text{—}CHCH_2NH}\right)_2(C_3N_3)NHCH_2CH_2N(CH_2COOM)_2$ A still further class of addition polymers is derived by the polymerization of a triazine derivative containing at least one T group and at least one alkylene imino group such as in the monomers:

$\left(\underset{CH_2}{\overset{CH_2}{|}}N\right)$—$(C_3N_3)[NHN(CH_2COONa)_2]_2$ and $\left(\underset{CH_2}{\overset{CH_2}{|}}N\right)_2$—$(C_3N_3)[NHN(CH_2COONa)_2]$ Many of the triazine derivatives of this invention can also be used to modify preformed polymers and copolymers having reactive hydrogens, such as cellulose, polyvinyl alcohol, wool, para cresol-aldehyde resins, polyvinyl amine, polyacrylic acid, etc., as illustrated by polyvinyl alcohol, thus:

$-(CH_2CH)_n- + nCl(C_3N_3)(NHNHCH_2COOCH_2CH=CH_2)_2 \longrightarrow$ $-(CH_2CH)-$
$\quad\quad |$
$\quad\quad O(C_3N_3)(NHNHCH_2COOCH_2CH=CH_2)_2$ Thus it may be seen that it is the intent of this invention to include in the compounds of this invention, triazine derivatives of the formula

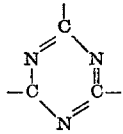

wherein at least one of the valencies is attached to a T group and at least one other valency is attached to a polymer.

Thus it may be seen that the Y groups may be any polymerizable group as well as a non-polymerizable group, and that thus the Y group itself may be a polymer or preformed polymer, and that the compounds of this invention can be classified as symmetrical triazines having the structure

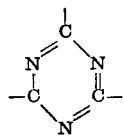

to which is attached at least one A' and at least one and no more than two T groups, in which the T groups are as defined hereinabove.

These coordination resins differ from the conventional ion-exchange resins. The convention ion-exchange resins are polymer matrices to which are attached functional acidic, basic or salt groups which are electrovalent in nature, and the resin exchanges ions by means of these groups in a manner similar to normal acids, bases or salts. The coordination resins are polymer matrices to which are attached functional groups capable of forming complexes with metal ions and metal salts through covalent linkages whereby more stable molecules are produced.

Coordination resins which contain in their structures substituents which function through the concerted action of salt forming groups and coordinating groups are sometimes considered as a special class of ion-exchange resins. However, it is well-known that the conventional ion-exchange resins are incapable of recovering heavy metal ions from solution containing a higher concentration of alkali- and alkaline-earth ions because such resins function solely by ion-exchange involving electrovalent bonds, and their performance is determined by mass action laws. This may be illustrated using a cation exchange resin as an example. Such a resin contains a crosslinked polymer matrix to which are attached functional acidic groups; such polymers may be regarded as insoluble acids. Undoubtedly, the most widely used ion-exchange resin today is the cation resin described in my U.S. Pat. 2,366,007 (1944) and is a sulphonated styrene-divinyl benzene polymer which may be represented by R—SO$_3$H, wherein R is the polymer matrix and —SO$_3$H represents the sulfonic acid groups attached to the benzene rings in the polymer. These polymers will form salts and will exchange its cations with the ion in solution. Thus the sodium form of the ion-exchange resin may be used to soften hard water by exchanging its sodium ions for the calcium and magnesium ions in solution, and because the process is one of ion exchange, leak-through of the calcium or magnesium ions will occur much before all of the sodium in the resin has been exchanged for the calcium or magnesium and the resin will have to be regenerated. The spent resin is regenerated using sodium chloride solutions which direct the equilibrium to reform the sodium salt of the polymer. From the foregoing it is obvious that the cation exchange resin would be incapable of removing small quantities of calcium or magnesium from solutions containing sodium chloride in higher concentrations than the concentration of calcium or magnesium, or that they could remove small quantities of cupric or other heavy metal ions from sodium chloride solution. It has been shown experimentally that in a column, the sodium salt of these resins shows little or no ability to remove copper from a 3% sodium chloride solution containing 250 parts per million of cupric ion.

In contrast to this, the coordination resins of this invention containing at least one T group per triazine ring, are able to remove the copper quantitatively from these sodium chloride solutions, and the copper derivative of these coordination resins are not regenerated to the sodium salt by sodium chloride. These results point to the utility of these resins capable of complexing metal cations by coordinations without depending on ion-exchange phenomena, not only in research and in the recovery of metals from processing wastes or from dilute solutions, or for the purification of medicinals, food and industrial products, or for the control of pollution, but also for carrying out such process in the presence of high concentration of alkaline and alkaline-earth salts such as sodium chloride, potassium chloride, calcium chloride, magnesium chloride, etc., and for the separation of these heavy metal cations from each other.

These chelating resins, as is the case in ion-exchange resins, can be prepared as small discreet particles in granular or bead forms and in these forms are used in columns or containers through which the solution containing the metal ions to be recovered or exchanged is passed. Initially, at the beginning of the process, the resin efficiency is high and high rates of flow can be used. As the capacity of the resin is decreased, its efficiency is decreased. Since, in the solid polymer, the rate of exchange or the coordination reaction is diffusion-controlled the functional groups in the inside of the mass of the polymer are not utilized efficiently unless the rate of the flow of the solution through the bed of polymer particles is sufficiently low. When the capacity of the polymer is exhausted or leak-through occurs, the process is interrupted and the resin regenerated.

The coordination resins of this invention can also be prepared in other forms, such as in open pore structures such as are obtained by impregnating open-pore natural sponges or synthetic cellulose sponges or polyurethane foams with the soluble, fusible condensation products and thereafter insolubilizing the condensation products in situ. Or they can be prepared in the form of sheets or membranes by impregnating cellulose pulp or paper, cotton mats, wood pulp, fiber board, sawdust board, cotton in the form of mats, woven fabrics, etc., with the intermediate stage of the condensation resins and thereafter insolubilized in situ. Likewise porous ceramic beads, slabs, tubes, etc., derived from fused alumina, silica, etc., can be impregnated with the soluble fusible condensation products and cured in situ.

The coordination resins can also be prepared in filamentary form by coating or impregnating fibers such as cotton, regenerated cellulose, polyvinyl alcohol, homo- and copolymer fibers, etc., with the condensation resins of this invention and then insolubilizing the product in situ. The filamentary form of these new resins of this invention are particularly useful in treating very dilute solutions of metals. In the treatment of very dilute solution, the costly handling of large volumes of solution to recover small quantities of metal, which, together with the high attrition loss of the granular polymer, makes the process uneconomical, as for example, to recover one part of copper from a solution containing 250 parts of copper per million, it is necessary to process 4000 pounds of the solution, whereas if the solution contains only 100 parts of copper per million, then 10,000 pounds of solution must be treated. The use of filamentary form eliminates some of the problems associated with the conventional granular processes by (1) preparing and using insoluble coordination polymers in filamentary form rather than in the form of discrete particles or membranes, and (2) contacting the solution with the coordination resin in filamentary form. A further improvement consists in contacting the solution containing the metal cations with a new surface of the filamentary coordination polymer before substantial exhaustion of the capacity of the coordination polymer occurs by advancing the filamentary polymer intermittently or continuously as desired or required. Furthermore, the solution may be treated in a batch process or in a continuous-flow system. Further improvements and modifications of the process of this invention include the continuous regeneration of the filamentary coordination resin as well as a continuous cyclic system which comprises contacting the solution of metal cations with the filamentary coordination polymer, regenerating the coordination polymer and recontacting a solution containing the metal cations with the regenerated coordination polymer.

The filamentary form of the coordination polymers used in the practice of this invention may be prepared and used in various forms depending upon the particular use desired and economic considerations. They may be prepared as single solid continuous-filaments similar to the commercial monofilament fishing lines of various diameters, which may be braided, twisted or woven into soft, pliable multifilament lines of various diameters. They may also be used in the form of hollow lines to increase the buoyancy of the filament, or in the form of a solid or hollow ribbon. Where long lengths of the filamentary coordination polymers are to be used in the process of this invention, and where there is danger of breakage due to the weight of unsupported polymer exceeding or approaching the limit of the tensile strength of the coordination polymer, the polymer may be reinforced by use of a reinforcing core of another filament such as another fiber, strands of fibers, wire, strands of wire or by forming a mixed, twisted, braided or woven filament with other reinforcing filaments. In other cases, the coordination polymer may be use as a coating on a core of fiber, fibers or wire. The choice of the specific form depends on the methods used in preparing the filamentary coordination polymer from the intermediate available, as well as the cost of the particular form prepared and the specific use made of the filamentary coordination polymer.

The behavior of the coordination groups in the compounds and resins of this invention is determined by their stability constants. Thus, when a coordinating group as illustrated by a mole of

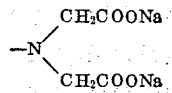

reacts by contact with a solution containing a mole of copper chloride, $CuCl_2$, the chelate structure

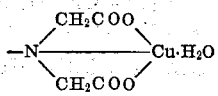

will form, and with a solution of a mole of nickel chloride, $NiCl_2$, the structure

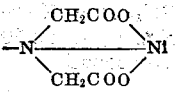

will form, and in another solution containing ½ mole of $CuCl_2$ and ½ mole of $NiCl_2$, ½ mole of each of these chelate structures will be formed. On the other hand, if a coordination group having a mole of imino diacetic acid coordinating groups is reacted with a solution containing one mole of copper chloride and one mole of nickel chloride, only the copper chelate will form because the stability constant of the copper chelate ($K_1$ is about $3.5 \times 10^{10}$) is greater than that of the nickel chelate ($K_1$ is about $2.75 \times 10^7$), and, for the same reason, if the nickel-chelated polymer is immersed in a solution of copper ion, the nickel will be replaced by copper, and nickel will go into solution, even though these metal chelates are not regenerated by alkali ions.

For the iminoacetic acid group, the qualitative order of selectivity is

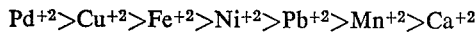

Thus, if a mole of each ion is in solution, seven moles of iminoacetic acid groups will be required on the polymer to react with the six heavy metal ions, and they will be absorbed simultaneously if sufficient iminoacetic acid groups are in contact with the solution, but if only one mole of iminoacetic acid groups is in contact with the solution, then only the lead is removed, and if two moles of iminoacetic acid are in contact with the solution, then lead and copper are removed, and if three moles of iminoacetic acid groups are in contact with the solution, then lead, copper and iron are removed, and similar for 4, 5, 6, etc., number of metals.

In the triazine derivatives, the activity of a coordination group, such as $—N(CH_2COOH)_2$,

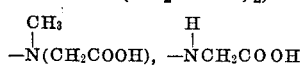

etc., depends on the manner the groups are attached to the triazine ring. For example, I have discovered that when such groups are attached directly to the triazine ring, as in such compounds as $$(NH_2)_2(C_3N_3)NHCH_2COOH$$

$$(NH_2)_2(C_3N_3)N(CH_2COOH)_2$$

$(C_3N_3)(NHCH_2COOH)_2$, $(C_3N_3)(NCH_2COOH)_3$, the coordination tendency of the aminoacid nitrogen is greatly reduced and that the substituent group functions more nearly as a carboxylic acid forming primarily electrovalent bonds; while the exact reason for this behavior is not thoroughly known, it may be explained on the basis that the basicity of the amino acid nitrogen has been greatly reduced by the attachment to the carbon atom in the triazine ring. Whether or not this theory explains this phenomenon satisfactorily, I have now discovered that if the amino nitrogen of the amino acid is attached to the carbon atom of a triazine ring by means of another atom or group of atoms so as to preserve the basicity of the amino nitrogen of the amino acid, then the coordination tendency of the amino acid is maintained. Accordingly, therefore, the T groups attached to the triazine ring are substituted amino acids in which at least one amino group is basic. These properties are found in the T groups defined hereinabove having the general formulas

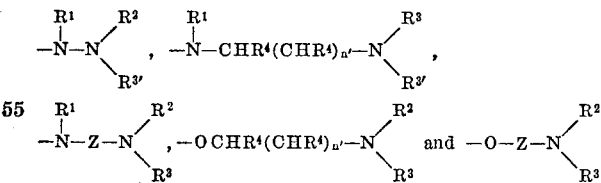

wherein $R^1$, $R^2$, $R^3$, $R^4$, N and $n'$ are as defined hereinabove.

The following examples illustrate the practice of this invention and are given by way of illustration and not by limitation. Unless specifically indicated otherwise, the parts and percentages are intended as parts by weight and percentages by weight, respectively.

EXAMPLE I

A slurry of cyanuric chloride is prepared by running a thin stream of a hot solution of 184.4 g. of cyanuric chloride in 400 ml. of acetone into 600 ml. of stirred mixture of ice and water (0–5° C.), and adding 366 parts of $NH_2NHCH_2COONa$ and raising the temperature slowly to 45° C., followed by the addition of 213 parts of allyl chloride, refluxed for two hours. Then is added 82 parts of $Na_2CO_3$ and the mixture heated to reflux for two hours, cooled, acidified with dilute $H_2SO_4$ and cooled to 5° C.; the triazine is removed by filtration. The filtrate is evaporated to dryness and extracted with anhydrous ethyl alcohol to recover addition product, and there is obtained an almost quantitative yield of

which, on analysis for C, H and N gives values in good agreement with the theoretical value for the compound.

EXAMPLE II

The procedure of Example I is repeated using 576 parts of $NH_2N(CH_2COONa)_2$ and 166 parts of allyl chloride. There is obtained the compound

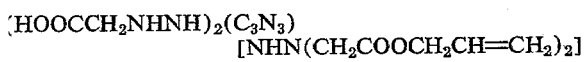

which on analysis for C, H and N gives values in close agreement with the theoretical values for the compound.

EXAMPLE III

To 750 ml. of water there is added 165 parts of $NH_2(C_3N_3)Cl_2$ (prepared by the procedure of J.A.C.S., 73, 2981 (1951)) and 384 parts of $NH_2N(CH_2COONa)_2$, and the mixture refluxed for two hours during which time a 5% NaOH solution is added at such a rate as to maintain the solution neutral or slightly so as indicated by phenolphthalein indicator in the solution. Then 153 parts of allyl chloride is added and refluxing continued for two hours. The triazine derivative is then isolated by the procedure of Example I, and there is obtained the compound, $$NH_2C_3N_3\begin{bmatrix}NH_2NCH_2COOCH_2CH=CH_2\\ |\\ CH_2COOH\end{bmatrix}_2$$

EXAMPLE IV

The procedure of Example III is repeated using 306 parts of $ClCH_2C_6H_4CH=CH_2$ in place of allyl chloride and there is obtained the compound $$NH_2C_3N_3\begin{bmatrix}NH_2NCH_2COOCH_2C_6H_4CH=CH_2\\ |\\ CH_2COOH\end{bmatrix}_2$$

EXAMPLE V

The procedure of Example III is repeated using 241 parts of $HOC_6H_4CH=CH_2$ in place of allyl chloride, and there is obtained the compound $$NH_2C_3N_3\begin{bmatrix}NH_2NCH_2COOC_6H_4CH=CH_2\\ |\\ CH_2COOH\end{bmatrix}_2$$

EXAMPLE VI

The procedure of Example I is repeated using an equivalent amount of cyanuric chloride in place of $NH_2(C_3N_3)Cl_2$ and the product has the formula $$ClC_3N_3\begin{bmatrix}NH_2NCH_2COOCH_2CH=CH_2\\ |\\ CH_2COOH\end{bmatrix}_2$$

EXAMPLE VII

The procedure of Example V is repeated using 239 parts of $(NH_2CONHNH)(C_3N_3)Cl_2$ and there is obtained the compound,

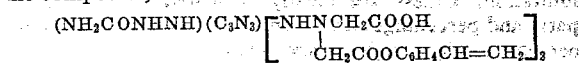

EXAMPLE VIII

The procedure of Example III is repeated using 209 parts of $HOCH_2CH_2NH(C_3N_3)Cl_2$ and there is obtained the compound

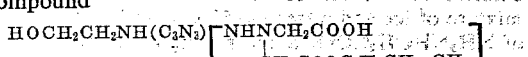

EXAMPLE IX

The procedure of Example IV is repeated using 233 parts of $(HOCH_2CH_2NH)_2C_3N_3Cl$ and there is obtained the compound

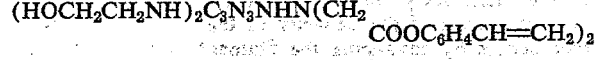

EXAMPLE X

The procedure of Example V is repeated using 344 parts of $(HOCH_2CH_2)_2N(C_3N_3)(Cl_2)$, and there is obtained the compound

EXAMPLE XI

The procedure of Example V is repeated using 285 parts of $(NaOOCCH_2NH)_3C_3N_3$ and there is obtained the compound

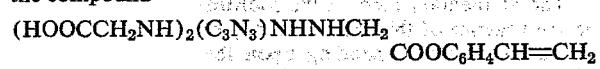

EXAMPLE XII

The procedure of Example I is repeated using 267 parts of $CH_2=CHC_6H_4NH(C_3N_3)Cl_2$ and omitting the allyl chloride, and there is obtained the compound $$CH_2=CHC_6H_4NH(C_3N_3)[NHN(CH_2COOH)_2]_2.$$

EXAMPLE XIII

The procedure of Example I is repeated using 330 parts of $(CH_2=CHC_6H_4NH)_2(C_3N_3)Cl$ and omitting the allyl chloride, and there is obtained the product $$(CH_2=CHC_6H_4NH)_2(C_3N_3)NHN(CH_2COOH)_2.$$

EXAMPLE XIV

The procedure of Example I is repeated using 269 parts of $CH_2=CHC_6H_4O(C_3N_3)Cl_2$ and omitting the allyl chloride, and there is obtained the compound $$CH_2=CHC_6H_4O(C_3N_3)[NHN(CH_2COOH)_2]_2.$$

When the procedure of Example IV is repeated using 334 parts of $(CH_2=CHC_6H_4O)_2(C_3N_3)Cl$ and omitting the allyl chloride, there is obtained the compound $$(CH_2=CHC_6H_4O)_2(C_3N_3)NHN(CH_2COOH)_2$$

EXAMPLE XV

The procedure of Example I is repeated using 227 parts of $(CH_2=CHCH_2O)_2(C_3N_3)Cl$ without the allyl chloride, and there is obtained the compound $$(CH_2=CHCH_2O)_2(C_3N_3)NHN(CH_2COOH)_2.$$

EXAMPLE XVI

The procedure of Example IV is repeated using 311 parts of $(CH_2=CHCH_2OOCCH_2O)_2C_3N_3Cl$ without the allyl chloride, and there is obtained the compound $$(CH_2=CHCH_2OOCCH_2)_2(C_3N_3)NHN(CH_2COOH)_2.$$

EXAMPLE XVII

The procedure of Example II is repeated using 260 parts of $(CH_2=CHC_6H_4NH)(C_3N_3)Cl_2$, 240 parts of $HCl \cdot NH_2N(CH_2COOC_2H_5)_2$, and 80 parts of NaOH, and there is obtained the compound $$(CH_2=CHC_6H_4NH)C_3N_3[NHN(CH_2COOC_2H_5)_2]_2$$

When 260 parts of $(CH_2=CHC_6H_4O)(C_3N_3)Cl_2$ are used instead of the vinylanilidotriazine there is obtained the compound $$(CH_2=CHCH_6H_4O)(C_3N_3)[NHN(CH_2COOC_2H_5)_2]_2$$

By these and related procedures such as given in J.A.C.S., 73, 2981–3008 (1951), J. Org. Chem., 24, 643 (1959), J. Org. Chem., 25, 202 (1960), Macromoleculare Chemie, 37, 25 (1960), the compounds of this invention shown in Table I can be readily prepared.

TABLE I

| T Group | Y Group | A' Group |
|---|---|---|
| —NHN(CH₂COOH)₂ | —P(=O)(OCH₂CH=CH₂)(OCH₂CH=CH₂) | —P(=O)(OCH₂CH=CH₂)(OCH₂CH=CH₂) |
| —NHC₂H₄N(CH₂COOH)₂ | —NHCH₂CH=CH₂ | —NHCH₂CH=CH₂. |
| Same as above | —NHCH₂CH₂OOCCH=CH₂ | —NHCH₂CH₂OOCCH=CH₂. |
| —NC₆H₄N(H)(CH₂COONa)(CH₂COONa) | —N(C₂H₅)₂ | —NHC₆H₄CH=CH₂. |
| —OC₆H₃(CH₂)N(C(CH₃)(COOH))(C(CH₃)(COOH)) | Same as above | —OC₆H₄CH=CH₂. |
| —NH—N(CH₂COOC₂H₅)₂ | —NHN(CH₂COOC₂H₅)₂ | —OC₆H₄CH=CH₂. |
| —NHN(CH₂COOC₂H₅)₂ | Same as above | —NHC₆H₄CH=CH₂. |
| Same as above | —OC₆H₄CH₂CH=CH₂ | —OC₆H₄CH₂CH=CH₂. |
| —NHN(CH₂COOH)₂ | —NHN(CH₂COOH)₂ | —N(CH₂COOCH₂CH=CH₂)(CH₂COOCH₂CH=CH₂) |
| —NHCH₂CH₂N(CH₂COOCH₃)₂ | —NHC₆H₄C(CH₃)=CH₂ | —NHC₆H₄C(CH₃)=CH₂. |
| —NHN(CH₂COOH)₂ | —NHC₆H₄CH=CH₂ | —NHC₆H₄CH=CH₂. |
| —NHCH₂CH₂N(CH₂COOCH₃)₂ | Same as above | Same as above. |
| —NH(CH₂)₃N(CH₂COOCH₃)₂ | do | Do. |
| —NHCH₂CH₂N(CH₂COOH)₂ | —NHCH₂CH₂OOCCH=CH₂ | —NHCH₂CH₂OOCCH=CH₂. |
| Same as above | —NHCH₂COOCH=CH₂ | —NHCH₂COOH=CH₂. |
| Do | —NHCH₂COOCH₂CH=CH₂ | —NHCH₂COOCH₂CH=CH₂. |
| Do | —NHC₆H₄COOCH₂CH=CH₂ | —NHC₆H₄COOCH₂CH=CH₂. |
| —NH(CH₂)₆N(CH₂COOH)₂ | —NHC₆H₄OCH₂CH=CH₂ | —NHC₆H₄OCH₂CH=CH₂. |
| Same as above | —NHC₆H₄NHCH₂CH=CH₂ | —NHC₆H₄CH₂CH=CH₂. |
| Do | —NHC₆H₄N(CH₂CH=CH₂)₂ | —NHC₆H₄N(CH₂CH=CH₂)₂. |

The triazine compounds of this invention containing at least one T group wherein the —COOH group is in the acid form, may be used in the acid form or they can be used in the form of salts. The salts are readily obtained by reaction with bases such as NaOH, LiOH, Ca(OH)₂, Mg(OH)₂, KOH, etc., or the corresponding oxides where available such as CaO, MgO, etc., or the free acid may be converted to ammonium salts by reaction with ammonia and the substituted ammonias such as the amines, hydrazines, hydroxyl amines, etc., for example, ammonia, methyl amine, ethyl amine, dibutyl amine, ethanol amine, diethanol amine, triethanol amine, hydrazine, N-methyl hydrazine, dimethyl hydrazine, phenyl hydrazine, ethylene diamine, diethylene triamine, phenylene diamine, pyridine, morpholine, piperazine, allyl amine, diallyl amine, propargyl amine, semicarbazide, guanidine, biguanidine, guanazole, trimethyl benzyl ammonium hydroxide, etc., as well as bases such as triphenyl phosphine, tributyl stilbene, etc. For other purposes the T group can possess the carboxyl structure in the form of an ester which is then hydrolyzed by acids and bases to produce the free acid or a salt, thus The new coordination compounds of this invention are readily prepared from the free acids of the new triazines of this invention and the corresponding oxides of the metal desired. However, they are more easily prepared by reacting a water soluble or water dispersible salt of the triazine compound with a water soluble metal derivative such as copper sulfate, nickel chloride, etc.

For example, when a solution of

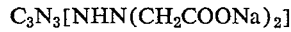

C₃N₃[NHN(CH₂COONa)₂]

is treated with a solution of CuSO₄, a blue complex is formed which precipitates from the solution, whereas when a solution of a cobalt salt is used, a red, insoluble precipitate is obtained. These dried precipitates do not change color substantially on exposure to U.V. light or when heated to 100° C. for twenty-four to forty-eight hours. Also, when these metal salts are reacted with the compounds of Examples I to XVI inclusive, coordination complexes are similarly obtained. Furthermore, when solutions of silver, cadmium, aluminum, chromium, iron, zinc, lead, titanium, uranium, zirconium, vanadium, uranium, palladium, lanthanum, mercury, nickel and manganese are used instead of copper and cobalt, coordination complexes are also obtained with the compounds of Examples I to XVII inclusive.

EXAMPLE XVIII

One hundred parts of the monomer prepared in Example I is slowly added over a period of less than an hour to 1000 parts of distilled water at 30–50° C. containing dissolved therein one part ammonium persulfate, one part of sodium bisulfite and 0.5 part of sodium dodecylbenzene sulfonate. The reaction is continued for six hours, at which time a yield of about 90 percent solid polymer is precipitated. The resulting polymer has a molecular weight over 10,000. The product is crushed into granules of about 50 mesh and immersed in a 500-part of a 5% solution of NaOH to form the sodium salt. The granules are then washed with distilled water to remove mechanically-held NaOH and kept in a moist condition.

Twenty-five (25) parts of the Na salt of the resin are added to 100 parts of solution containing 5 parts of CuCl and allowed to stand for one hour. The resin become blue in color and the copper becomes substantially exhausted from the solution. Similar exhaustions are obtained when a 1% solution of CuCl₂ in a 3% solution, or a 0.1% solution of CuCl₂ in a 1% NaCl solution is used.

Recovery of copper is also obtained from solutions containing other alkali and alkali-earth salts such as the salt of potassium, lithium, magnesium, calcium, strontium such as their chlorides, nitrates, sulfates, phosphates and acetates. For example, all of the copper is recovered readily from a 15% calcium chloride solution having 25 p.p.m of copper ion, as well as when the potassium, lithium, cesium, barium and calcium salts of the coordination resin is used. Using the procedure described by J. Bjerrum 'Metal Amine Formation in Aqueous Solution," publisher Haase and Son, Copenhagen, 1941) it is determined that the polymer forms both 1:1 and 1:2 chelates whose ability constants are approximately $K_1=5.75\times10^9$ and $K_2=1.52\times10^6$. The polymer also forms coordinate compounds with ferric chloride corresponding to a 1:1, 1:2 and 1:3 below pH values of about 8.5, and the stability constants of these compounds are approximately about $K_1=1.25\times10^{10}$, $K_2=4.55\times10^7$ and $K_3=8.1\times10^4$. Similar results are obtained when the procedures of this example are repeated using individually the monomers of Examples I–XVII respectively.

EXAMPLE XIX

The procedure of Example XVIII is repeated with cobaltic chloride solutions and the metal is recovered in a similar manner. During the process the coordination polymer becomes red as it reacts with the cobalt ions.

When solutions of silver, cadmium, molybdenum, aluminum, cesium, lanthanum, chromium, manganous, manganic, ferrous, ferric, nickel, zinc, lead, platinum palladium vanadium, tantalum, zirconium, titanium, and uranium ions are used instead of the cobalt ions, they are also recovered in a similar fashion.

While the invention has been described in relation to various specific embodiments thereof, it is understood that many substitutions and other modifications thereof can be made within the scope and spirit of the invention.

The invention claimed is:

1. A composition of matter comprising the addition polymerization product of a composition comprising a triazine of the formula

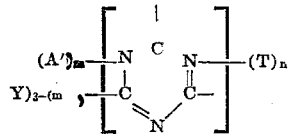

wherein $n$ and $m$ are integers of at least one and no more than two and the sum of $m$ and $n$ does not exceed three; Y is any monovalent radical; A' is a group containing a terminal polymerizable $CH_2=C<$ group connected to the triazine nucleus by means of a divalent radical selected from the class consisting of alkylene, arylene, amino, carboxylate, hydrazine and combinations thereof; and T is selected from the class of

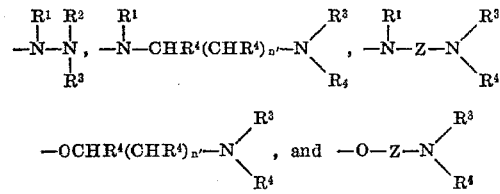

wherein each of the symbols, $R^1$, $R^2$ and $R^3$ individually represents a radical selected from the class of —H, —CHR⁴COOM and a hydrocarbon radical containing one to six carbon atoms and wherein at least one of the radicals represented by $R^1$, $R^2$ and $R^3$ represents a carboxyl group or an M salt thereof; M is a member consisting of hydrogen, ammonium bases and metals, and $R^4$ represents a radical selected from the class consisting of hydrogen and a hydrocarbon radical containing one to six carbon atoms, $n'$ represents an integer of one to six, and —Z— is a divalent hydrocarbon radical containing six to twelve carbon atoms.

2. A composition of claim 1 wherein the triazine contains one T group and two A' groups.

3. A composition of claim 1 wherein the triazine contains two T groups and one A' group.

4. The composition of claim 2 wherein the triazine is $(CH_2=CHCOOCH_2CH_2NH)_2(C_3N_3)T$.

5. A composition of claim 2 wherein the triazine is $(CH_2=CHC_6H_4NH)_2(C_3N_3)T$.

6. A composition of claim 2 wherein the triazine is $(CH_2=CHCH_2O)_2(C_3N_3)T$.

7. A composition of claim 3 wherein the triazine is $(CH_2=CHCOOCH_2CH_2NH)(C_3N_3)T_2$.

8. A composition of claim 3 wherein the triazine is $(CH_2=CHC_6H_4NH)(C_3N_3)T_2$.

9. A composition of claim 3 wherein the triazine is $(CH_2=CHCH_2)_2N(C_3N_3)T_2$.

10. A composition of claim 1 in which the polymerization is performed in the presence of another vinyl monomer other than the triazine.

11. A composition of claim 10 in which the other monomer contains two terminal vinyl groups.

12. A composition of claim 11 in which the other monomer is divinyl benzene.

13. A composition of claim 4 in which the T group is —NHN(CH₂COOM)₂.

14. A composition of claim 4 in which the T group is —OC₆H₄N(CH₂COOM)₂.

15. A composition of claim 5 in which the T group is —NHN(CH₂COOM)₂.

16. A composition of claim 6 in which the T group is —OCH₂CH₂N(CH₂COOM)₂.

17. A composition of claim 7 in which the T group is —NHC₆H₄N(CH₂COOM)₂.

18. A composition of claim 8 in which the T group is —NHC₆H₄N(CH₂COOM)₂.

19. A composition of claim 9 in which the T group is —NHCH₂CH₂N(CH₂COOM)₂.

References Cited

UNITED STATES PATENTS 3,050,496  8/1962  D'Alelio ............ 260—88.3
3,056,760  10/1962  D'Alelio ............ 260—88.3
3,165,515  1/1965  D'Alelio ............ 260—88.3

HARRY WONG, JR., Primary Examiner

U.S. Cl. X.R.

117—124, 126, 128.4, 140, 141, 142, 145, 148, 154, 161, 169; 204—159.22; 210—38; 260—2.1, 2.2, 2.5, 41, 45.8, 47, 51, 57, 63, 77.5, 78.3, 78.4, 78.5, 79.7, 80, 80.3, 82.1, 85.5, 85.7, 86.1, 87.5, 87.7, 88.3, 88.7, 89.7, 91.3, 232, 248

UNITED STATES PATENT OFFICE
CERTIFICATE OF CORRECTION

Patent No. 3,645,997  Dated February 20, 1972

Inventor(s) Gaetano F. D'Alelio

It is certified that error appears in the above-identified patent and that said Letters Patent are hereby corrected as shown below:

Correct the formula in Claim 1 (Column 19, Lines 33-38) to read:

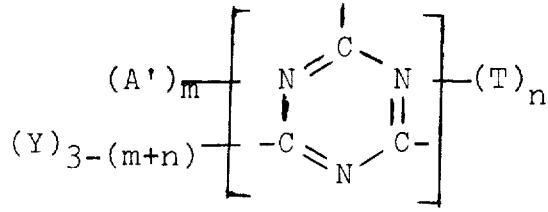

Signed and sealed this 20th day of June 1972.

(SEAL)
Attest:

EDWARD M. FLETCHER, JR.  ROBERT GOTTSCHALK
Attesting Officer  Commissioner of Patents